Patented Mar. 28, 1950

2,501,865

UNITED STATES PATENT OFFICE 2,501,865

PENTAERYTHRITOL

Walter M. Fuchs, New York, N. Y.

No Drawing. Application November 5, 1945,
Serial No. 628,383

4 Claims. (Cl. 260—635)

This invention refers to the manufacture of pentaerythritol.

It is an object of this invention to provide an accelerated process for the manufacture of pentaerythritol.

It is another object of this invention to provide a process for obtaining strong colorless solutions of pentaerythritol.

In the customary process of manufacture, formaldehyde and acetaldehyde are permitted to react in presence of lime according to the equations

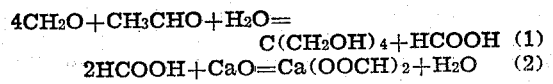

$$4CH_2O + CH_3CHO + H_2O =$$
$$C(CH_2OH)_4 + HCOOH \quad (1)$$
$$2HCOOH + CaO = Ca(OOCH)_2 + H_2O \quad (2)$$

Theoretically four mols formaldehyde, one mol acetaldehyde and one half mol lime give one mol pentaerythritol and one half mol calcium formate. The actual yields, however, are considerably smaller than theoretical. This is due to various side-reactions. For instance, it is well known that commercial pentaerythritol is composed of pure pentaerythritol accompanied by dipentaerythritol and related compounds. These byproducts are undesirable in nitration grade pentaerythritol, though not in ester grade pentaerythritol. Other side-reactions occasion the formation of strongly colored, yellow to brown byproducts which cause a serious decrease of yield and make the isolation of pentaerythritol more difficult. It is also noted that ordinarily reaction (1) does not easily go to completion.

Known arrangements for avoiding formation of colored byproducts are based upon a slow, carefully controlled introduction of reagents which makes the manufacture of pentaerythritol a time consuming process. Even so, formation of colored byproducts is hardly ever completely avoided.

In order to improve upon reaction rate, quality and quantity of yield, inventors have proposed the use of more formaldehyde than is required by Equation 1, the addition of catalysts to the reaction mixture, or special procedures of reagent introduction.

By the use of the present invention it has become possible to accelerate reaction (1), to inhibit the formation of colored byproducts and to obtain close to theoretical yields of commercial pentaerythritol in strong colorless solution. This is achieved without the use of excess formaldehyde, or expensive catalysts, and without relying upon time consuming arrangements.

The starting point for the development of the present invention was supplied by the observation that the rate of reaction could be accelerated beyond the disclosure of the art by mixing the reagents in the exact proportions of the Equations 1 and 2 at once.

In a series of experiments, samples composed of 0.1 mol formaldehyde in form of commercial formalin solution, 0.025 mol acetaldehyde in form of a 20% aqueous solution and 0.0125 mol quenched quicklime were placed into Erlenmeyer flasks kept in a waterbath at about 60° C. The progress of the reaction was followed by titrating the unreacted lime after specified periods of time. Under these conditions the lime consumption after one hour amounted to 84% of the total, after two hours to 94%, and after three hours to 95%. While such reaction rate is quite satisfactory, the reaction mixtures started to turn yellow within the first hour, and the final solutions were of a dirty orange color. Upon evaporation of the neutralized solutions strongly colored residues were noted.

It has now been found that by the addition of boric acid or boric acid salts to the reaction mixture the formation of colored byproducts can be completely avoided. Moreover, it has been found that in presence of boric acid or boric acid salts the formation of pentaerythritol is further accelerated.

In the practice of this invention it is convenient to use boric acid and to increase the amount of lime required on the basis of Equations 1 and 2 by a quantity needed to give calcium metaborate.

In a series of experiments, samples composed of 0.1 mol formaldehyde in form of commercial formalin solution, 0.025 mol acetaldehyde in form of a 20% aqueous solution, 0.0012 mol boric acid and 0.013 mol quenched quicklime were placed into Erlenmeyer flasks kept in a waterbath at about 60° C. The progress of the reaction was followed by titrating the unreacted lime after specified periods of time. Under these conditions the lime consumption after one hour amounted to 94%, after two hours to 97%, and after three hours to over 98%. All these solutions were entirely colorless and gave colorless residues upon evaporation.

The weight of the colorless residue checked rather closely with the amount to be expected on the basis of Equations 1 and 2. For example, in a two hour experiment the dry residue weighed 5.0 g. The theory calls for 5.1 g. of which 3.4 g. should be commercial penta, 1.6 g., calcium formate, and 0.1 g., calcium borate.

Actual determinations of pure pentaerythritol by the benzal procedure showed that more than 80 and less than 90% of the commercial penta formed in the experiments with boric acid consisted of pure pentaerythritol with the total yield of commercial product ranging from 95 to 100% of the theoretical possibility.

By the use of the present invention it is possible to accelerate the manufacturing process further by working at temperatures above those heretofore deemed advisable. In practice a temperature of 70° C. has been considered as a limit. In presence of boric acid it is possible to go beyond this temperature. Thus, formation of pentaerythritol can be brought to virtual completion in less than 60 minutes with almost theoretical yields not contaminated by colored byproducts.

Similar but weaker effects were noted by the addition of silica gel to reaction mixtures.

The minimum quantity of boric acid required for the operation of the new process varies somewhat with the temperature of reaction. At 60° C. it is sufficient to have in the mixture about one mol of boric acid for ten mols of lime. At 80° C. it is necessary to have approximately one mol of boric acid for four mols of lime. Especially at elevated temperature it is possible to operate a convenient continuous process with resulting formation of strong colorless commercial pentaerythritol solutions.

The results were reproduced in experiments involving pound quantities of the reagents. If desired the boric acid can be recovered by steaming after addition of the necessary amount of, e. g., sulfuric acid or formic acid. The separation of pentaerythritol and calcium formate is a matter of record.

I claim:

1. A process for manufacturing pentaerythritol, in which boric acid, 4 mols formaldehyde, one mol acetaldehyde, and 0.5 mol calcium hydroxide, and an additional amount of calcium hydroxide for converting the boric acid into calcium metaborate, are reacted, and the entire amounts of these reactants are mixed substantially at once in an aqueous reaction medium heated to a temperature not in excess of 80° C.

2. A process for manufacturing pentaerythritol, in which boric acid, 4 mols formaldehyde, one mol acetaldehyde, and 0.5 mol calcium hydroxide, and an additional amount of calcium hydroxide for converting the boric acid into calcium metaborate are reacted, and the entire amounts of these reactants are mixed substantially at once in an aqueous reaction medium, and the reaction mixture is heated to a temperature not in excess of 80° C.

3. A process for manufacturing pentaerythritol, in which boric acid, 4 mols formaldehyde, one mol acetaldehyde, and 0.5 mol calcium hydroxide, and an additional amount of calcium hydroxide, for converting the boric acid into calcium metaborate are reacted and the entire amounts of these reactants are mixed substantially at once in an aqueous reaction medium, one mol of boric acid being used for ten mols of calcium hydroxide, and the reaction mixture is heated to about 60° C.

4. A process for manufacturing pentaerythritol, in which boric acid, 4 mols formaldehyde, one mol acetaldehyde, and 0.5 mol calcium hydroxide, and an additional amount of calcium hydroxide for converting the boric acid into calcium metaborate are reacted and the entire amounts of the reactants are mixed substantially at once in an aqueous reaction medium, one mol of boric acid being used for 4 mols of calcium hydroxide, and the reaction mixture is heated to about 80° C.

WALTER M. FUCHS.

REFERENCES CITED

The following references are of record in the file of this patent:

UNITED STATES PATENTS

| Number | Name | Date |
| --- | --- | --- |
| 1,878,040 | Voss | Sept. 20, 1932 |
| 2,004,010 | Naujoks | June 4, 1935 |
| 2,011,589 | Paterson | Aug. 20, 1935 |

OTHER REFERENCES

Gilman, "Organic Syntheses," Collective vol. I, second edition, pages 425–7.

Partington "Textbook of Inorganic Chemistry," 5th Ed., MacMillan, London (1937), page 717.